July 29, 1958
B. STAROS
2,844,960
AIR SPEED MEASURING DEVICE
Filed Nov. 30, 1953
3 Sheets-Sheet 1
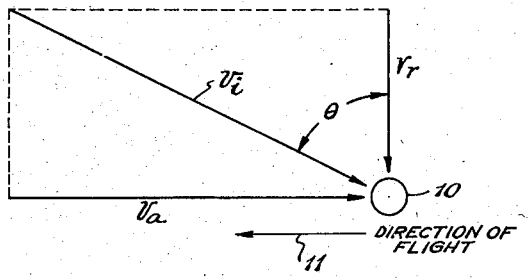
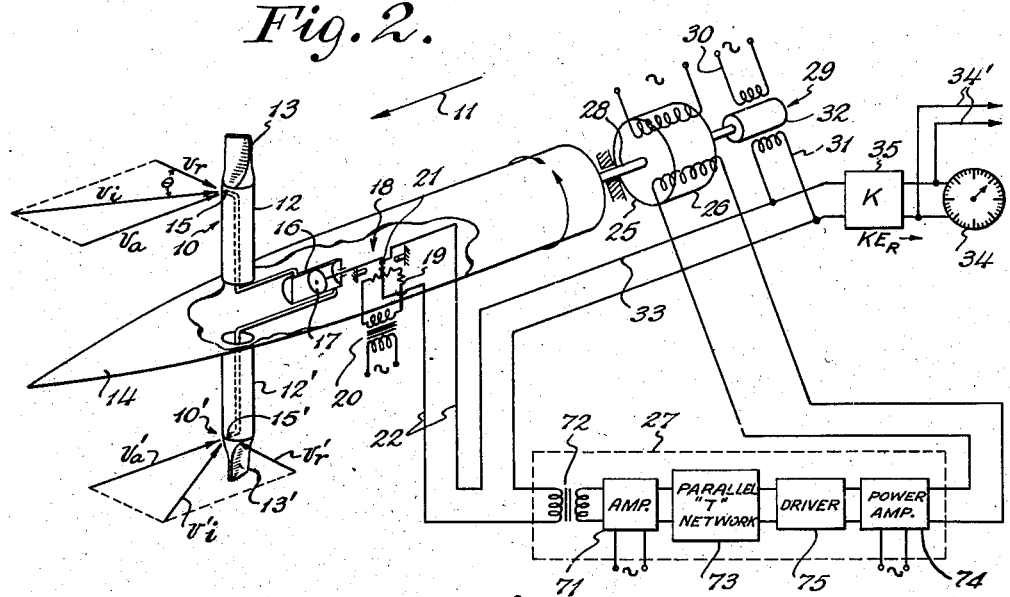
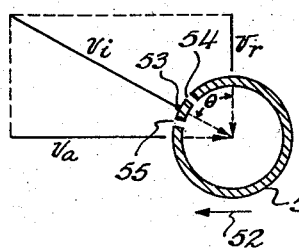
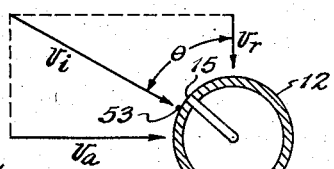
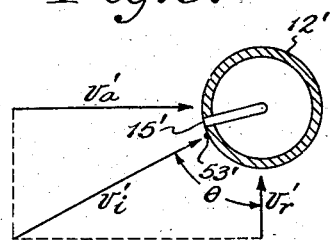
INVENTOR
BASIL STAROS
BY
ATTORNEY July 29, 1958    B. STAROS    2,844,960
AIR SPEED MEASURING DEVICE
Filed Nov. 30, 1953    3 Sheets-Sheet 2

INVENTOR
BASIL STAROS
BY
ATTORNEY

INVENTOR
BASIL STAROS
BY
ATTORNEY

United States Patent Office 2,844,960
Patented July 29, 1958

2,844,960

AIR SPEED MEASURING DEVICE

Basil Staros, Massapequa, N. Y., assignor to Sperry Rand Corporation, a corporation of Delaware Application November 30, 1953, Serial No. 395,178

21 Claims. (Cl. 73—181)

The present invention relates generally to air speed indicators and more particularly to an air speed indicator for aircraft which provides an indication of the true air speed of the craft.

At the present time, the most generally used air speed indicators for aircraft are those which depend upon the impact pressure of air on a pressure sensitive device, occurring as the aircraft is driven through the air. In most cases, the dial reading of the air speed indicator tells the pilot the "indicated" air speed of his craft, which indication must be converted into "true" air speed for navigational purposes by means of tables, calculators, or charts. This coversion is a function of altitude and temperature. Some air speed meters give directly an output proportional to true air speed, the conversion being made through suitable mechanical and/or electrical connections in the meter. "Indicated" and "true" air speeds are identical under normal sea level conditions and at low Mach numbers. At higher altitudes "true" air speed is derived from "indicated" air speed by correcting the latter for lowered atmospheric pressure and also for temperature changes, i. e., for air density.

The present invention is directed to a device for measuring directly the true air speed of an aircraft and is characterized by the provision of a true air speed indication which is derived by methods and means which are completely independent of atmospheric pressure, temperature, and Mach number.

The principle upon which the air speed indicator of the present invention is based is that of an air flow direction detector, which is capable of sensing air flow direction only, rotated in a plane perpendicular to the direction of flight of the craft, and relating or comparing the direction of air flow around the detector with its rotational speed and deriving therefrom a measure of the true air speed of the craft. Therefore, since the measure of true air speed is dependent only upon air flow direction, it follows that it is effectively independent of pressure, temperature, density and Mach number.

Generally, the true air speed meter of the present invention comprises an air flow direction detector mounted on the aircraft and rotated about an axis which is generally perpendicular to the longitudinal axis or the direction of travel of the craft such that the local air flow field at the detector will produce an output at the detector only if the air flow therearound is not characterized by a specific flow direction. Since, for all free air stream velocities of the craft, the detector can be made to maintain a fixed flow direction in the vicinity of the detector by means of an adjustment in its angular position relative to its plane of rotation or by its rotational speed, there exists a direct correlation between the velocity of the craft and the angular position of the detector or the rotational velocity of the detector.

More specifically, if an air flow direction detector is mounted on an aircraft for rotation in a plane perpendicular to the direction of travel of the craft, the detector will advance through the air along a helix of constant pitch for a particular constant air speed. Then, considering any one instant of time in its rotation, the detector will be subjected to an air speed component which is the resultant of two respectively perpendicular air speed components, one proportional to the velocity of the craft in its direction of travel, and the other proportional to the rotational velocity of the detector normal to the direction of travel. These components can be considered as vectors which, for a particular air speed, bear a right triangular relation to one another, whereby if the magnitude of the rotational speed vector component is known and the angle of the resultant vector component is known, the magnitude of the craft air speed vector component can be determined.

Thus, the primary object of the present invention is to provide an air speed meter for measuring directly the true air speed of an aircraft through the air mass in which it is flying which is independent of local air pressure, density, temperature and Mach number, i. e., the provision of a true air speed indicator which depends only upon direction of air flow.

Another object of the invention is to provide a true air speed meter in which an air flow direction detector is mounted on the aircraft for rotation at a predetermined rotational velocity in a plane perpendicular to the direction of travel of the aircraft such that the detector will be subjected to an air speed which is the resultant of the air speed of the craft and the rotational velocity of the detector, the angle of the resultant air speed relative to the plane of rotation of the detector and the rotational velocity of the detector being represented by vectors of a right triangle whereby a trigonometric relation exists therebetween and from which the magnitude of the true air speed of the craft can be determined.

More specifically, an object of the present invention is to provide an air speed measuring device in which the magnitude of the forward air speed vector of the aircraft is determined from a measurable quantity corresponding to an air speed vector which is normal to the forward air speed vector of the craft and a measurable quantity corresponding to the direction of the vector resultant of said normal air speed vector and said forward air speed vector, these vectors corresponding to the sides of a right triangle mutually related in a trigonometric manner whereby a trigonometric relation exists therebetween and the magnitude of the forward air speed vector is determined by maintaining the right triangular relation between the elements of the right triangle. The physical structure of the device comprises an air-pressure-responsive means or an air flow direction detector which is mounted for rotation about the longitudinal axis of the aircraft for determining the direction of the resultant air speed vector, this measure being representative of one of the determining elements of the right triangle, a motor for rotating the pressure-responsive device, the rate of rotation thereof being representative of another determining element of the right triangle. In one case, the right triangular relation between the air speed vectors is maintained by varying the motor speed in response to the output of the pressure-responsive means so that the latter is made to detect a predetermined fixed direction of air flow, the measure of craft's forward air speed being a function of the speed of rotation of the detector. In another case, the right triangular relation between the vectors is maintained by fixing the speed of rotation of the pressure-responsive means and varying the position of the pressure-responsive means so that it is made to detect different directions of air flow for different forward air speeds, the measure of the craft's forward air speed being a function of the position of the pressure-responsive means. In either case, the variable is controlled by the detection of a change in the direction of air flow as sensed by the pressure-responsive means so as to restore the right triangular relation between the vectors, the measure of the forward air speed being a function of the amount of control required to so restore the right triangular relation between the vectors.

Other objects and advantages of the present invention will be apparent from the following detailed description of the preferred embodiments of the present invention illustrated in the accompanying drawings wherein:

Fig. 1 is a schematic diagram illustrating the relationship between the various air speed vector components and serves to illustrate the principles of operation of the air speed meter of the present invention;

Fig. 2 is a schematic perspective view of a preferred embodiment of the present invention;

Fig. 3 is a cross-sectional view of an air stream direction detector which may be employed in the embodiment of the invention illustrated in Fig. 2;

Figs. 4 and 5 are cross-sectional views of the air stream direction detector employed in the embodiment illustrated in Fig. 2;

Figure 6:
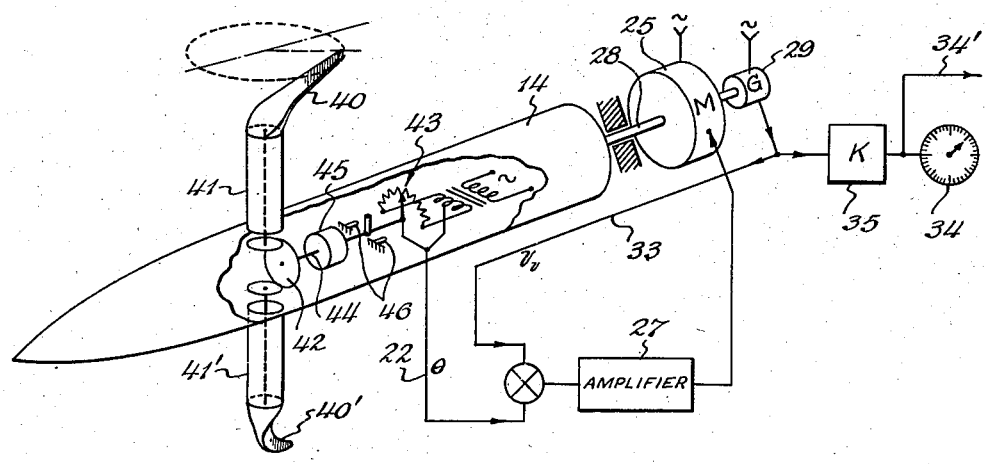
Fig. 6 is a view of a modification of the embodiment of the present invention illustrated in Fig. 2.

The vector diagram shown in Fig. 1 illustrates the relationship that exists between the air speed vector components effective at any instant of time on an element as the element advances through the air at a constant pitch helix. In the present invention the element under consideration is an air flow direction detector which constitutes an air-pressure-responsive means for determining the direction of air flow therearound, generally represented by reference character 10 (Figs. 1 and 2) which is mounted on the craft for rotation in a plane perpendicular to the direction of travel of the craft (arrow 11). If the detector 10 is rotated at a predetermined angular velocity in this plane, such rotational velocity or tangential velocity may be represented by a vector $V_r$ in Fig. 1. Also, the velocity of the aircraft may be represented by the vector $V_a$, these two vectors being at right angles to each other by construction. The air flow direction detector 10 will be subjected to a resultant air speed represented by the vector $V_i$ which, for a particular air speed of the craft and rotational speed of the detector, will lie at an angle $\theta$ relative to the direction of the vector $V_r$, i. e., the plane of rotation of the detector 10. From an inspection of Fig. 1, it can be seen that for all air speeds of the craft, if the detector 10 is made to maintain the angle $\theta$ fixed or constant by means of an adjustment in the magnitude of the vector $V_r$, i. e., the rotational speed of the detector, there will exist a direct correlation between the velocity of the craft and the rotational velocity of the detector, from which the magnitude of the vector $V_a$, i. e., the velocity of the craft, can be determined. Conversely, if the vector $V_r$ is maintained constant by an adjustment in the angular position of the detector relative to its plane of rotation (angle $\theta$), there also exists a direct correlation between the velocity of the craft $V_a$ and the angular position $\theta$ of the detector 10.

It is well known that in a right triangle, if the value of any two of the elements of the right triangle are known, any other of the elements thereof can be determined therefrom. Thus, the determination of the magnitude of the craft air speed vector $V_a$ depends upon the preservation of the right triangular relation between these air speed vector components. Either the angle $\theta$ is maintained constant and the vector $V_r$ is the controlled variable or the vector $V_r$ is maintained constant and the angle $\theta$ is the controlled variable. In either case, in accordance with the present invention, the variable is controlled or varied in response to a detected change in the direction of the resultant vector $V_i$ so as to restore the right triangular relationship, the amount of the change required being proportional to the change in the forward air speed vector $V_a$, i. e., proportional to the change in air speed of the craft.

From Fig. 1:

$$\tan \theta = \frac{V_a}{V_r} \qquad (1)$$

or $$V_a = V_r \tan \theta \qquad (2)$$

However, if $\theta$ is held constant and $V_r$ is made the controlled variable, $$V_a = KV_r \qquad (3)$$

Then, if a servo equalizing or zeroing loop is employed making $KV_r$ equal to $V_a$ then the air speed vector $V_a$ can be determined from $V_r$. Further, if $V_r$ is held constant and $\theta$ is made the controlled variable, from (2) above $$V_a = K \tan \theta \qquad (4)$$

Again, if a servo equalizing or zeroing loop is employed making $K \tan \theta$ equal to $V_a$ then the air speed vector $V_a$ can again be determined as a function of $\theta$.

The embodiments of the present invention illustrated in the drawings are what may be termed electromechanical analogue computers which solve the air speed Equations 2, 3 or 4 set forth above. However, it will be understood that the equations set forth above represent the basic principles of my invention and these equations may be modified and the terms employed therein may be altered or rearranged with a corresponding rearrangement of apparatus for solving such rearranged equations without departing from the true scope and spirit of the invention as defined in the appended claims.

In Fig. 2 there is schematically illustrated a preferred embodiment of the present invention wherein an elongated, preferably streamlined member 14 is mounted on the aircraft structure at such a location that it will be subjected to the free air stream supporting the craft. Such a location might preferably be forward of a wing tip, or, more preferably, on a boom extending forwardly from the nose of the aircraft such that it will not be subject to turbulence generally surrounding the aircraft structure. The member 14 is mounted at the selected location for rotation about an axis which is generally parallel to the fore and aft axis of the craft, this axis being the reference axis of the system. Near its forward end, the member 14 carries an air flow direction detector or pressure responsive means 10 which, in the present embodiment, comprises a pair of tubes or cylinders 12, 12' extending in opposite directions radially from the axis of rotation of member 14. Near the outer end of each tube and positioned at equal distances radially from the axis of rotation of member 14, are orifices 15, 15' each being connected through suitable conduits to opposite sides of a differential pressure device or cylinder 16. The relationship between the pressures at the orifices and their relative positions will be hereinafter more fully described. Cylinder 16 is divided into two compartments by a suitable piston or flexible wall 17 so that if the pressures at the orifices are equal, flexible wall or piston 17 will be centered, but if the pressures at the orifices are not equal, piston 17 will be moved in one direction or the other determined by the difference in pressure at the orifices, thereby actuating a suitable pick-off 18, which is herein shown as a potentiometer, to produce a signal upon the occurrence of a differential pressure at the two orifices. This signal has a polarity dependent upon the direction of movement of the piston 17 and a magnitude dependent upon the extent of movement thereof.

The potentiometer comprises a winding 19 energized through a transformer 20 from a suitable source of electrical energy such as a constant peak amplitude alternating current, and a wiper 21 cooperable therewith and connected to be displaced by the piston 17 of pressure responsive device 16. Therefore, movement of wiper 21 will produce a signal on leads 22 which is dependent upon and varies preferably in proportion to any change in the direction of the resultant air speed vector $V_i$ relative to the plane of rotation of the detector as detected by orifices 15, 15' as will be explained.

Although the air flow direction detector 10 of Fig. 2 comprises two tubes extending in opposite directions radially from the member 14, each of the two tubes being provided with a single orifice equally spaced radially from the axis of rotation of the member 14, a better understanding of the operation of the detector will be had if only a single tube having two orifices therein is considered. Fig. 3 illustrates a section through such a single-tube air flow direction detector, the section being taken laterally of the tube and in the plane including the two orifices. As above, if the tube 50 in Fig. 3 is mounted on member 14 and is rotated in the direction of the arrow 51 as the craft upon which it is mounted moves in the direction of the arrow 52, the effective air flow to which the tube 50 is subjected may be represented by the air velocity vector $V_i$, the magnitude and direction of which is the resultant of the craft air speed velocity vector $V_a$ and rotational velocity vector $V_r$. As the air moving in the direction $V_i$ impinges upon the cylinder 50 there will be a stagnation point 53 about which the air will divide and flow at equal velocities from the point 53 around each side of the cylinder 50. For this particular direction of air flow, if orifices 54 and 55 are placed at equal distances from the stagnation point 53 in the plane of the section, each orifice will be subjected to equal pressures. However, for any other direction of resultant air flow, the stagnation point 53 will move accordingly toward one orifice and away from the other thereby producing a differential pressure at the orifices 55 and 56. This differential pressure may be detected and used to determine the change in the direction of air flow. From the above then, it is evident that the single tube 50 with orifices 54 and 55 constitute an accurate air-pressure-responsive air flow direction detector for detecting changes in the angle $\theta$ of the resultant air speed vector $V_i$.

The two-tube air flow direction detector 10 illustrated in Fig. 2 operates on exactly the same principle as the single tube detector 50 hereinabove described. Fig. 4 is a sectional view of the tube 12 taken in the plane of the orifice 15 looking toward the rotation axis of member 14, and Fig. 5 is a view of the tube 12' tube in the plane of orifice 15' and also looking toward the rotation axis of member 14. Fig. 4 shows the position of the orifice 15 therein relative to the stagnation point 53 created by the resultant or effective air flow velocity to which the tube 12 is subjected as a result of a particular craft air velocity and rotational velocity of the detector. As shown, the orifice 15 is placed to one side of and preferably relatively close to the stagnation point 53 toward the plane of rotation of the tube 12 so that, for the air flow indicated by vector $V_i$, a predetermined pressure will exist at the orifice 15. In Fig. 5 the orifice 15' is placed to one side of and preferably relatively close to the stagnation point 53' created by the resultant air flow velocity vector $V_i'$ for the same rotational velocity vector $V_r'$ and craft velocity vector $V_a'$ toward the axis of rotation of the member 14. The distance of the orifice 15' from the stagnation point 53' is, of course, exactly equal to the distance of the orifice 15 of tube 12 relative to the stagnation point 53. Thus, a pressure will exist at orifice 15' which is exactly equal to the pressure existing at orifice 15 and, as in the case of the single tube air flow direction detector, if the direction of the resultant air stream velocity vectors $V_i$, $V_i'$ change due to a change in air speed of the craft or in the rotational velocity of the member 14, the stagnation points 53, 53' will move toward one or the other of the orifices 15, 15' thereby producing a pressure differential in the pressure responsive device 16.

In the embodiment of Fig. 2, the orientation of the orifices 15, 15' relative to the plane of rotation of the detector 10 is fixed at some predetermined angle, i. e., the tubes 12, 12' are rigidly fixed to the member 14. The angular orientation of the detector is preferably selected from a design standpoint as a function of an optimum, practical, rotational velocity of the member 14 and the normal cruising speed of the craft. If the air flow direction sensed by the orifices is at an angle other than that at which pressure difference at the orifices is zero, the potentiometer 18 will provide a signal at leads 22 through difference pressure device 16—17, which is employed to increase or decrease the speed of rotation of the detector so as to reduce this signal toward zero, i. e., toward a zero signal condition corresponding to a right triangular arrangement of the vectors hereinabove described.

The control signal source may be arranged to supply a signal varying preferably linearly with changes in the direction of air flow from a position at which the pressure at orifice 15 is a maximum, i. e., at which the vector $V_i$ lies closer to the vector $V_r$, to a position where the pressure at orifice 15' is a maximum, i. e., at which the vector $V_i$ lies closer to the vector $V_a$.

The member 14 is always rotated, for example, in the direction of the arrow shown in Fig. 2 by means of a suitable motor 25 which, in the embodiment illustrated in Fig. 2, comprises an A. C. two-phase induction motor having its fixed field energized from a suitable source of electrical energy and its control field 26 energized by the output of a servo amplifier 27, the function of which will hereinafter be more fully described. Through conventional means, the two phases of the motor are excited substantially 90° electrically out of phase. Attached to the motor drive shaft 28 is a generator 29, having an output proportional to the rotational velocity of member 14 and, therefore, of the detector 10. Generator 29 may be of any suitable form such as, for example, an A. C. eddy-current generator as described in Riggs U. S. Patent 2,408,813, having an input winding 30 energized from a suitable source of constant peak amplitude alternating current and an output winding 31 which has induced therein by rotation of rotor 32, an alternating current having a peak amplitude proportional to the rotational velocity of the rotor 32 and a phase corresponding to the phase of the energization winding 30.

The generator output appearing on leads 33 is used together with the output of the signal source including pick-off 18 to control the speed of drive motor 25 through a suitable servo amplifier 27 of conventional form. The error signal from the pick-off 18 is supplied as an input signal to a preamplifier 71 through coupling transformer 72. The output of preamplifier 71 is applied to a parallel T network 73, the output thereof being a voltage proportional to the original input signal and the rate of change thereof which is applied to a power amplifier stage 74 through a driver network 75. The output of servo amplifier 27 is supplied to the control winding 26 of drive motor 25. The output of generator 29 proportional to the speed of rotation of motor 25 and therefore determinative of the vector $V_r$, is supplied to the input of amplifier 27 in a degenerative fashion so that the input signal to amplifier 27 is proportional to the difference between the signals from pick-off 18 and generator 29. Thus, the motor 25 is speeded up or retarded in an amount determined by the magnitude of the error signal at the potentiometer 18. In other words, the speed of rotation of the air flow detector 10 is increased or decreased in an amount such that the differential pressure at the orifice 15, 15' is reduced toward zero. At zero differential pressure, the direction of the resultant air speed component $V_i$ will coincide with that shown in Fig. 1 wherein it forms the hypotenuse of a right triangle.

In order to decrease the power required of motor 25 in driving the member 14, suitable propeller blades 13 and 13' may be secured to the support members 12, 12', Alternatively, the support members 12, 12' themselves may be so shaped as to supply a driving force to the member 14.

The operation of the embodiment of the present invention illustrated in Fig. 2 will now be described. Assume that the craft increases its forward air speed from some existing air speed. Such an increase in forward speed will in effect increase the vector $V_a$ thereby rotating the vector $V_1$ toward the orifice 15' and away from the orifice 15, assuming no change in vector $V_r$. Thus, the differential pressure at orifices 15, 15' will increase the pressure on one side of piston 17 and potentiometer wiper 21 will be moved along potentiometer winding 19 producing a signal on leads 22. This signal is supplied as an error signal to the input of amplifier 27 where it is amplified and the amplifier output signal is supplied to the motor 25 calling for an increase in the speed thereof in the direction of the arrow in Fig. 2. The increased speed of rotation of the member 14 and detector 10 will tend to reduce the differential air pressure at orifice 15, 15' thereby reducing the error signal toward zero.

Referring to Fig. 1 again, during the above operation the magnitude of the vector $V_r$ has been increased by an amount necessary to maintain the direction of vector $V_1$ at the predetermined angle $\theta$ relative to the plane of rotation of the detector 10. Therefore, since a direct relation exists between the rotational speed of the detector and the angular position thereof, which in the present embodiment is maintained constant, the magnitude of the generator output signal will bear a direct relation to the air speed of the craft. The generator signal may then be used, after being multiplied by the proportionality constant K as at 35, to actuate the air speed indicator 34 or to supply a signal proportional to the air speed of the craft to other equipment on the craft through leads 34'. The proportionality constant K is determined by the predetermined fixed angle $\theta$. Thus, in this embodiment of the invention, the measure of the air speed of the craft represented by the vector $V_a$ (Fig. 1), is proportional to the speed of rotation of member 14, represented by the magnitude of vector $V_r$ since the angular orientation of the orifice 15, 15' relative to the craft's longitudinal axis is a known, fixed quantity, see Equation 3 above.

In Fig. 2 the air flow direction detector is illustrated as comprising two tubes 12, 12' each having a single orifice 15, 15' at the outer ends thereof. This construction is desirable from a design standpoint since it results in a configuration which is dynamically balanced about the axis of rotation of member 14. However, it is to be understood that only a single tube is necessary having two orifices therein as heretofore described in regard to Fig. 3, in which suitable counterweights may be provided to dynamically balance the member 14 about its axis of rotation. Of course, it is within the scope of the invention to provide two oppositely disposed tubes 12, 12', as illustrated, but in which two orifices are placed equidistantly from the stagnation point of each tube as shown in Fig. 3.

In Fig. 6 there is shown a modification of the embodiment illustrated in Fig. 2. However, in this modification, the air flow direction detector comprises a pair of vanes 40, 40' which are pivotally mounted for restrained rotation about an axis perpendicular to the axis of rotation of the member 14. The vanes 40, 40' are supported in suitable bearings at the ends of a pair of posts or supports 41, 41' secured to and extending radially in opposite directions from the rotating member 14. The vanes preferably are so designed that the greatest mass thereof lies on their axis of support, the extremities being relatively thin and tapered. It will be also noted that the extremities of the vanes project radially outwardly into the air stream at a substantial angle relative to the axis of rotation of the member 14. With this construction, the sensitive extreme portions of the vanes are not subjected to turbulence which might be present adjacent support members 41, 41'. Furthermore, since the greatest mass of the vanes 40, 40' is concentrated substantially on the axis of rotation of the vanes on supports 41, 41' centrifugal forces acting on the vanes and tending to rotate the same about their axes of rotation will be substantially reduced or eliminated. The vanes may be connected through suitable gearing 42 to a pick-off 43 through shaft 44. Pick-off device 43 may be of any suitable type, such as, for example, a potentiometer similar to potentiometer 18 of Fig. 2 or any other pick-off device may be employed, such as a synchro transmitter, so long as it provides an output signal varying in dependence upon and preferably linearly proportional to angular deviations of the vanes from the predetermined design angle $\theta$. Limit stops 46 may be employed here to limit the movement of the vanes 40, 40'.

In this embodiment of the invention, it is desirable to include a suitable damping device 45 between the shaft 44 and the pick-off 43. The damper may be of any suitable type, such as a conventional paddle-in-fluid damper; or a conventional eddy-current damper may conveniently be employed. The damper functions to damp the servo system including pick-off 43, amplifier 27 and motor and generator 25 and 29 and also to damp out or attenuate any random or rapid vibrations of the vanes 33, 33' which may be caused by unavoidable air turbulence or by any other relatively short period disturbances. The remaining portions of the modification illustrated in Fig. 6 are identical to that shown in Fig. 2 and the operation is identical to that of the embodiment illustrated in Fig. 2.

Figure 7:
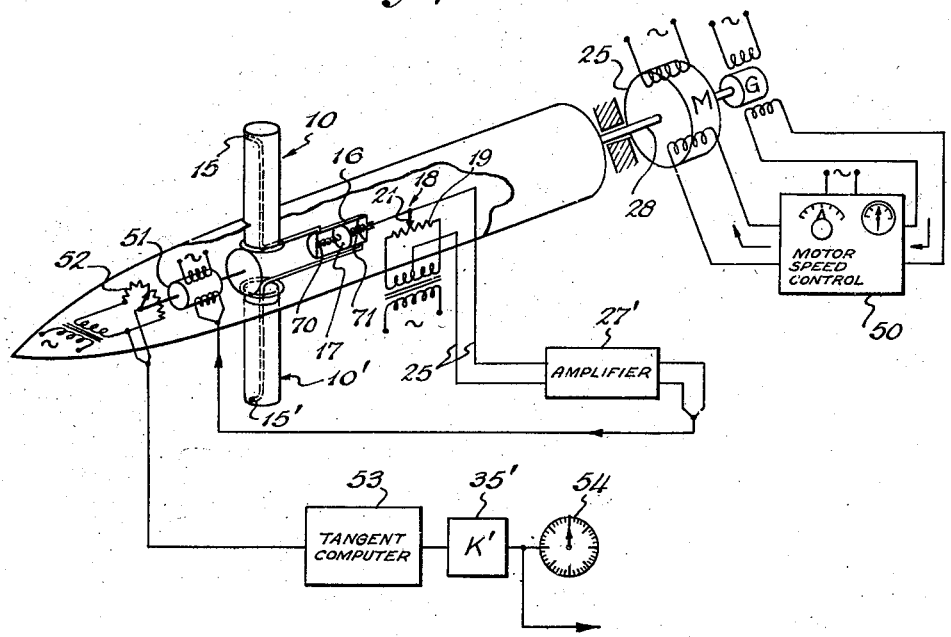
Fig. 7 is a view similar to Fig. 2 and showing another embodiment of the present invention.

In Fig. 7 there is disclosed another embodiment of the present invention. In this embodiment of the invention, the overall structure of the air speed measuring device is generally similar to that illustrated in Fig. 2. It will be recalled that in Fig. 2 the angular disposition of the air flow detector 10 is fixed and the rotational speed of the detector is adjusted in an amount to cause the differential pressure at the orifices 15, 15' to be reduced to zero, i. e., to maintain the resultant air flow in a fixed direction by varying the rotational speed of the member 14. In the embodiment illustrated in Fig. 7, however, the motor 25 is caused to rotate the member 14 at a constant speed thereby fixing the magnitude of the rotational speed vector $V_r$ while the position of the detector or air-pressure-responsive means is varied, i. e., the angle $\theta$ in Fig. 1 is varied, the measure of the forward air speed of the craft being determined from the angular position of the detector relative to the plane of rotation thereof. As shown in Fig. 7, an accurate, stable, motor speed control is provided, the speed being adjustable, if desired, for predetermined ranges of air speeds by means of motor speed control 50. In the present embodiment, a positional follow-up servo loop is provided for causing the air flow detector to be positioned to detect the direction of the resultant air speed vector $V_1$. Thus the pick-off, which again may be a potentiometer 18 supplies a signal upon the occurrence of a differential pressure at the orifice 15, 15' of detector 10 which signal is supplied to the input of a conventional servo amplifier 27', the output of which is supplied to motor 51 which in turn adjusts the angular position of the detector 10 relative to its plane of rotation to reduce the signal at pick-off 18 toward zero. In other words, the detector 10 is rotated to a position where it detects a new angle $\theta'$ of the resultant air flow vector $V_1$ produced by a change in the air speed of the craft. In this embodiment of the invention, the follow-up servo for positioning detector 10 may be damped by means of a pair of preferably identical springs 70, 71. Other conventional forms of damping means may of course be employed. Also, suitable gear reduction between motor 51 and the detector 10 may be employed and if desired, a speed generator may be connected to the motor, the output of which is fed back degeneratively to the input of amplifier 27' thereby obtaining an accurate and stable positional servo control.

In the embodiment of Fig. 7, the angle through which the detector is rotated is related to the true air speed of the aircraft. The indication of true air speed may be obtained by connecting a linear potentiometer 52 to the output of motor 51 thereby generating a signal which varies in accordance with and preferably linearly proportional to the angle through which the detector 10 has been positioned. Since the output of potentiometer 52 is a voltage linearly proportional to the angle $\theta$, a tangent computer 53 is provided for generating a signal proportional to the tangent of the angle through which the detector is positioned. This tangent signal is supplied to a meter 54 through a network 35' which multiplies the tangent signal by proportionality constant K', see Equation 4 above. The tangent computer 53 may be of the type disclosed in U. S. Patent 2,595,309 issued to J. Slater and assigned to the assignee of the present invention. However a more practical arrangement is provided if the potentiometer 52 is wound as a tangent function, in which case the output of potentiometer 52 is applied directly to the multiplier network 35' and thence to the air speed meter 54.

Figure 8:
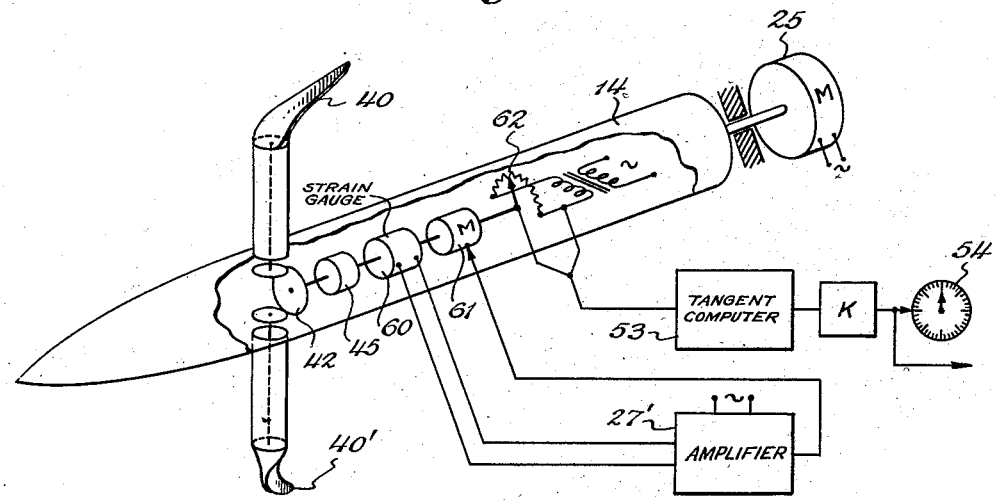
Fig. 8 is a view similar to Fig. 7 showing a modification of the embodiment illustrated therein.

In Fig. 8 there is shown a modification of the embodiment of the invention illustrated in Fig. 7. In this modification wind vanes 40, 40' are again employed as the pressure responsive air flow direction detector, as in Fig. 6. The vanes are pivotally mounted on supports for rotation about an axis perpendicular to the axis of rotation of the member 14. Vanes 40, 40' are again connected through suitable gearing 42 to position one side of a pick-off device 60, the other side of pick-off device 60 being connected to be positioned by a motor 61 as will be described. The pick-off device 60 may conveniently comprise an electrical strain gauge such as, for example, a Rochelle salt crystal or the like, the output of which is an electrical signal which varies in accordance with and preferably proportionally to the amount of torsion or twist applied thereto, the output of pick-off device 60 being supplied to amplified 27'. As in Fig. 7, the member 14 is driven at a constant rotational velocity through motor 25, the speed control of which is not shown but which may be of the same type as shown in Fig. 7. The output of the amplifier 27' is supplied to motor 61 which in turn adjusts the position of the wind vanes 40, 40' through strain gauge coupling 60 in a direction and in an amount such as to reduce the signal output of the strain gauge 60 toward zero, the amount of the adjustment, as measured by potentiometer 62, being proportional to the amount of change in the true air speed of the craft which originally produced the error signal at the strain gauge 60 through the change in the direction of the resultant air speed vector $V_i$ detected by vanes 40, 40'. Here again, as in Fig. 7, the potentiometer 62 may be of the functional type and provide an output proportional to the tangent of the angle through which motor 61 positions vanes 40, 40', or a linear potentiometer may be employed, its output being supplied to a tangent computer 53 as in Fig. 7. Again, the output of the tangent potentiometer or the tangent computer is multiplied by the constant proportionality K in order to supply an output proportional to the true air speed of the craft, see Equation 4 above.

Figure 9:
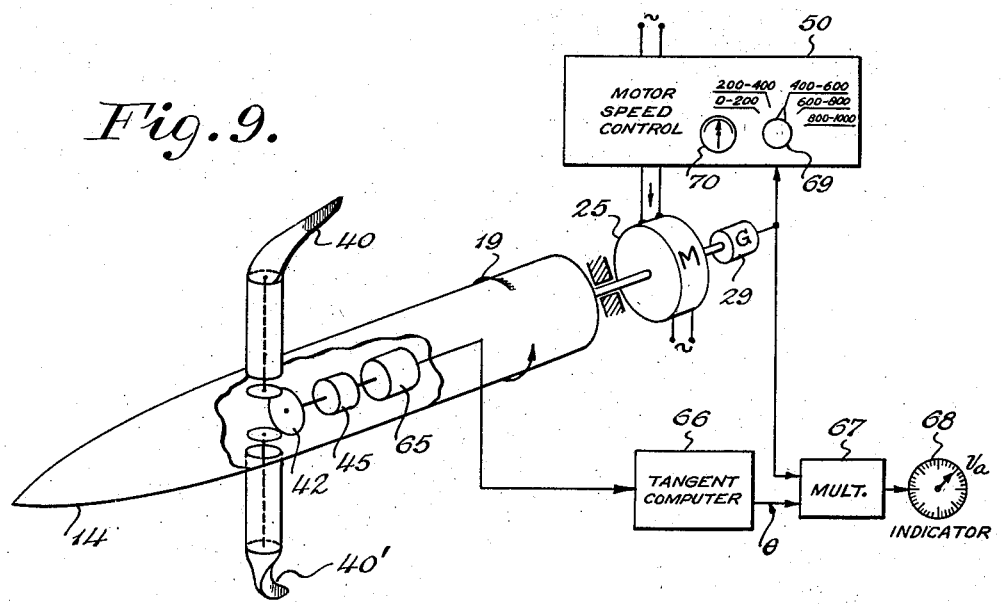
Fig. 9 is a view of still another embodiment of the present invention.

In Fig. 9 there is shown a further embodiment of the present invention in which the wind vanes 40, 40' are allowed to position themselves to the angle $\theta$ of the resultant air flow vector $V_i$, the speed of rotation of the detector being maintained constant as in Figs. 7 and 8, as by motor speed control 50. Preferably, a damper 45 is employed between vanes and pick-off to damp out spurious movements of the vanes as in the embodiment of Fig. 6. In this embodiment a signal proportional to the angular position of the vanes 40, 40' as generated by pick-off 65 and a signal proportional to the rotational velocity of the member 14 as determined by generator 29 are provided. Since the rotational velocity of the member 14 is a known and fixed quantity and since the angle of the resultant air speed vector is determinable, these two quantities can be employed to provide a signal voltage proportional to the true air speed vector of the craft. Referring again to Fig. 1 and Equation 1 above, the true air speed of the craft $V_a$ can be determined by the product of the two quantities, $V_r$ and tan $\theta$. Thus, the voltage proportional to the angle $\theta$ is supplied to a tangent computer 66 to produce a voltage proportional to the tangent of $\theta$. The multiplier 67 receives this tan $\theta$ voltage and a voltage proportional to $V_r$ and supplies an output proportional to the product thereof, the product voltage being proportional to the true air speed of the craft and indicated by meter 68. It will be noted that in the modification illustrated in Fig. 9, no follow-up is employed, the true air speed signal being computed directly from the angular deflection of the wind vanes 40, 40' and the fixed rotational velocity of the member 14. In Fig. 9, since no follow-up is employed, the signal from the pick-off 65 should be linear over a considerable range of angular displacement of the vanes 40, 40'. Therefore, it is preferable to limit the angular deflection of the vanes 40, 40' thereby reducing the range over which the pick-off signal must be linear. This may be accomplished by changing the speed of the motor 25 in steps, each step corresponding to a particular range of air speeds, as by means of knob 69 on the motor voltage supply, the knob having a pointer cooperating with a scale of ranges of air speeds such as 0–200, 200–400, 400–600, 600–800, etc. A meter 70 may be employed to indicate whether or not the speed of rotation of the member 14 is what it should be. This further provides a check on the performance and operation of the instrument. A similar motor speed control may be employed in the embodiments illustrated in Figs. 7 and 8.

In the foregoing description of the various embodiments of the present invention and in the following claims, it will be understood that the term "air-pressure-responsive means" is used in its broadest sense and includes not only orifices, diaphragms, and the like, but also vanes, flaps, and the like.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An air speed measuring device in which the magnitude of the forward air speed vector of a moving object is determined from a measurable quantity corresponding to an air speed vector normal to the forward air speed vector and a measurable quantity corresponding to the direction of the vector resultant of said normal air speed vector and said forward air speed vector, said vectors being the sides of a right triangle mutually related in a trigonometric manner, said device comprising means including air-pressure-responsive means mounted for rotation about an axis parallel to the longitudinal axis of an object, the air speed of which is to be measured, for determining the angular direction of said resultant air speed vector relative to said axis, the angular orientation thereof representing a measure of one determining element of said right triangle when said determined angular direction is in alignment with the direction of said resultant vector, motor means for rotating said pressure-responsive means about said axis, the rate of rotation thereof representing a measure of another determining element of said right triangle, and means responsive to said pressure-responsive means for varying the operation of one of the means which represents a measure of one of said determining elements, so as to align said determined angular direction with the direction of said resultant vector, the measure of the magnitude of said forward air speed vector being a function of said measures of said normal air speed vector and said determined angular direction.

2. An air speed measuring device in which the magnitude of the forward air speed vector of a moving object is determined from a measurable quantity corresponding to an air speed vector normal to the forward air speed vector and a measurable quantity corresponding to the direction of the vector resultant of said normal air speed vector and said forward air speed vector, said vectors being the sides of a right triangle mutually related in a trigonometric manner, said device comprising means including air-pressure-responsive means mounted for rotation about an axis parallel to the longitudinal axis of an object, the air speed of which is to be measured, for determining the direction of said resultant air speed vector relative to said axis, the angular orientation thereof representing a measure of one determining element of said right triangle when said determined direction corresponds to the direction of said resultant vector, signal generating means operated by said pressure-responsive means for providing a signal corresponding to the angular orientation of said pressure-responsive means relative to the direction of said resultant air speed vector, motor means for rotating said pressure-responsive means about said axis, the rate of rotation thereof representing a measure of another determining element of said right triangle, and means responsive to said signal for varying the operation of one of the means which represents a measure of one of said determining elements so as to align said determined direction with the direction of said resultant vector, the measure of the magnitude of said forward air speed vector being a function of said measures of said normal air speed vector and said determined angular direction whereby to provide a measure of the true air speed of said object.

3. An air speed measuring device in which the magnitude of the forward air speed vector of a moving object is determined from a measurable quantity corresponding to an air speed vector normal to the forward air speed vector and a measurable quantity corresponding to the direction of the vector resultant of said normal air speed vector and said forward air speed vector, said vectors being the sides of a right triangle mutually related in a trigonometric manner, said device comprising means including air-pressure-responsive means mounted for rotation about an axis parallel to the longitudinal axis of an object, the air speed of which is to be determined, for determining the direction of said resultant air speed vector relative to said axis, the angular orientation thereof representing a measure of one determining element of said right triangle when said determined direction is coincident with said resultant vector, signal generating means operated by said pressure-responsive means for providing a signal corresponding to the angular orientation of said pressure-responsive device relative to the angular orientation of said resultant air speed vector, motor means for rotating said pressure-responsive means about said axis, signal generating means operated by said motor means for providing a signal proportional to the rate of rotation thereof, said rate signal representing a measure of another determining element of said right triangle, and means responsive to both of said signals for varying one of the means which represents the measure of one of said determining elements, so as to align said determined direction with the direction of said resultant vector, the measure of the magnitude of said forward air speed vector being a function of said measures of the magnitude of said normal air speed vector and the angular orientation of said pressure-responsive means, whereby to provide a measure of the true air speed of said object.

4. An air speed measuring device in which the magnitude of the forward air speed vector of a moving object is determined from a measurable quantity corresponding to an air speed vector normal to the forward air speed vector and a measurable quantity corresponding to the direction of the vector resultant of said normal air speed vector and said forward air speed vector, said vectors being the sides of a right triangle mutually related in a trigonometric manner, said device comprising means including air-pressure-responsive means mounted for rotation about an axis parallel to the longitudinal axis of an object, the air speed of which is to be determined, for measuring deviations in the direction of said resultant air speed vector from a predetermined orientation of said pressure-responsive means, signal generating means operated by said pressure-responsive means for providing a signal proportional to said deviation, motor means for rotating said pressure-responsive means about said axis, generator means operated by said motor means for providing a signal proportional to the rate of rotation thereof, said rate signal representing a measure of the magnitude of the vector normal to said forward air speed vector, and means responsive to both of said signals for varying the rate of rotation of said pressure-responsive means whereby to align the direction of said resultant vector with the predetermined orientation of said pressure-responsive means, the measure of said forward air speed vector being a function of a measure of the rate of rotation of said pressure-responsive means and the predetermined orientation thereof whereby to provide a measure of the forward air speed of said object.

5. An air speed measuring device in which the magnitude of the forward air speed vector of a moving object is determined from a measurable quantity corresponding to an air speed vector normal to the forward air speed vector and a measurable quantity corresponding to the direction of the vector resultant of said normal air speed vector and said forward air speed vector, said vectors being the sides of a right triangle mutually related in a trigonometric manner, said device comprising a member mounted for rotation about an axis parallel to the longitudinal axis of an object, the air speed of which is to be determined, air-pressure-responsive means mounted on said member for rotation therewith and adapted to measure deviations in the direction of said resultant air speed vector from a predetermined orientation of said pressure-responsive means, signal generating means operated by said pressure-responsive means for providing a signal variable from a predetermined value in proportion to said deviation, motor means for rotating said member, signal generating means operated by said motor means for providing a signal proportional to the rate of rotation of said member, said rate signal representing a measure of the magnitude of the vector normal to said forward air speed vector, and means responsive to both of said signals for varying the rate of rotation of said member whereby to maintain said deviation signal at said predetermined value to thereby align the direction of said resultant vector with the fixed orientation of said pressure-responsive means, the measure of the magnitude of said forward air speed vector being a function of the measure of the rate of rotation of said member and the orientation of said pressure-responsive means whereby to provide a measure of the true air speed of said object.

6. A device of the character set forth in claim 5 wherein said air-pressure-responsive means comprises support members projecting radially from said rotatable member and having orifices formed therein near the outer leading edges thereof, said orifices being so positioned on said support members as to be subjected to equal air pressures when the direction of said resultant air speed vector corresponds to the fixed orientation of said pressure-responsive means but are subjected to differential air pressures when the direction of said resultant air speed vector does not correspond to the orientation of said pressure-responsive means, and means connected to said orifices and responsive to the pressure thereat for measuring said differential pressure whereby to provide a measure of deviations in the direction of said resultant air speed vector from a fixed orientation of said pressure-responsive means.

7. A device of the character set forth in claim 5 wherein said air-pressure-responsive means comprises support members extending radially from the axis of rotation of said rotatable member and having vanes pivotally supported thereon for rotation about an axis perpendicular to the axis of rotation of said rotatable member and adapted to be positioned by the air flow therearound, and said signal generator comprises a pick-off responsive to the angular orientation of said vane relative to the axis of rotation of said member for providing a measure of the direction of air flow therearound corresponding to the direction of said resultant air speed vector.

8. An air speed measuring device in which the magnitude of the forward air speed vector of a moving object is determined from a measurable quantity corresponding to an air speed vector normal to said forward air speed vector and a measurable quantity corresponding to the direction of the vector resultant of said normal air speed vector and said forward air speed vector, said vectors being the sides of a right triangle mutually related in a trigonometric manner, said device comprising means including air-pressure-responsive means mounted for rotation about an axis parallel to the longitudinal axis of an object, the air speed of which is to be determined, for determining the angle of said resultant air speed vector relative to said axis, said angle representing a measure of one determining element of said right triangle when the angular orientation of said pressure-responsive means corresponds to the direction of said resultant vector, means for rotating said air-pressure-responsive means at a constant rate of rotation about said axis, said rate of rotation corresponding to a measure of another of said determining elements of said right triangle, signal generating means operated by said pressure-responsive means for providing a signal corresponding to a change in the angle of said resultant air speed vector due to a change in the forward air speed of the object, means responsive to said deviation signal for angularly displacing said pressure-responsive means in a direction to reduce said deviation signal toward zero whereby to position said pressure-responsive means to the angular orientation of said resultant air speed vector, means responsive to the angular position of said pressure-responsive means for providing a signal proportional to a trigonometric function thereof, and means responsive to said last-mentioned signal for providing a measure of the change in said forward air speed vector, whereby to provide a measure of the change in the forward air speed of said craft.

9. A device of the character set forth in claim 8 wherein said air-pressure-responsive means comprises support members projecting radially from said rotatable member and having orifices formed therein near the outer leading edges thereof, said orifices being so positioned thereon as to be subjected to equal air pressures when the orientation thereof corresponds to the direction of said resultant air speed vector but are subjected to differential air pressures when the orientation thereof does not correspond to the direction of said resultant air speed vector, and means connected to said orifices and responsive to the pressure thereat for measuring said differential pressure whereby to provide a measure of deviations in the direction of said resultant air speed vector from the orientation of said orifices.

10. A device of the character set forth in claim 8 wherein said air-pressure-responsive means comprises support members extending radially from the axis of rotation of said rotatable member and having vanes pivotally supported thereon for rotation about an axis perpendicular to the axis of rotation of said rotatable member and adapted to be positioned by the air flow therearound, and said signal generator comprises a pick-off responsive to the angular orientation of said vane relative to the axis of rotation of said member for providing a measure of the direction of air flow therearound corresponding to the direction of said resultant air speed vector.

11. A device for measuring the forward air speed of a craft comprising a detector for sensing the direction of ambient air flow mounted on said craft for rotation in a plane perpendicular to the direction of travel of the craft, means for rotating said detector whereby it will be subjected to an air speed component which is the resultant of respectively perpendicular components of the air speed of the craft and the rotational speed of the detector, said air speed components defining vectors normally mutually related in a right triangular manner when the orientation of said detector is aligned with the direction of said resultant air speed component, means coupled with said detector for providing a measure of the angular orientation of said detector relative to the plane of rotation thereof, means coupled with said detector rotating means for providing a measure of the magnitude of said rotational speed component, means responsive to one of said measures for controlling the operation of one of the means providing said measures whereby to align the orientation of said detector with the direction of said resultant component, and means responsive to the operation of said control means for providing a measure which is a function of the magnitude of said forward air speed component whereby to provide a measure of the forward air speed of said craft.

12. A device for measuring the forward air speed of a craft comprising an air flow direction detector having an output dependent upon the direction of ambient air flow mounted on said craft for rotation in a plane perpendicular to the direction of travel of the craft and positioned at a predetermined angle with respect to its plane of rotation, motor means for rotating said detector whereby it is subjected to an air speed component which is the resultant of respectively perpendicular components of the air speed of the craft and the rotational speed of the detector, said speed components being represented by vectors normally mutually related in a right triangular manner to one another when the direction of said resultant air speed vector is aligned with the predetermined angular position of said detector, pick-off means coupled with said detector for providing a first signal dependent upon deviations in the angle of said resultant component from said predetermined angular position of said detector, generator means coupled with said rotating means for providing a second signal proportional to the rotational speed component of said detector, and means responsive to both of said signals for adjusting the rotational speed of said detector whereby to reduce said detector pick-off signal to a value corresponding to said predetermined angular position so as to align the position of said detector with the direction of said resultant air speed vector, and means responsive to a trigonometric function of the operation of said adjusting means for providing a measure of the magnitude of the forward air speed component, whereby to provide a measure of the forward air speed of said craft.

13. A device of the character recited in claim 12 in which said air flow direction detector includes a wind vane pivotally mounted for rotation about an axis perpendicular to the axis of rotation of said detector, and said detector pick-off means comprises an electrical signal generator providing an output corresponding to the extent of rotation of said wind vane from a predetermined angular position relative to its axis of rotation.

14. A device of the character recited in claim 12 in which said air flow direction detector comprises a member journalled in said air craft for rotation about an axis parallel to the direction of travel of said craft, an arm mounted at one end thereof on said member and extending in a direction perpendicular to the axis of rotation thereof, and having a pair of angularly spaced orifices positioned at the other end thereof, the bisector of the angle between said orifice lying at a predetermined angle with respect to the plane of rotation thereof, each orifice being subjected to equal air pressures when the direction of said resultant air flow lies in a direction corresponding to said predetermined angle but is subjected to differential air pressures when the direction of said resultant air flow lies in a direction other than the predetermined angle, and said detector pick-off means comprises a pressure-responsive device having an output dependent upon the differential air pressure at said orifices.

15. A device for measuring the forward air speed of a craft comprising an air flow direction detector having an output dependent upon the direction of ambient air flow and mounted on said craft for rotation in a plane perpendicular to the direction of travel of the craft, means for angularly positioning said detector relative to its plane of rotation, means for rotating said detector at a predetermined constant speed whereby it is subjected to an air speed component which is the resultant of respectively perpendicular components of the air speed of the craft and the rotational speed of the detector, said speed components being vectors normally mutually related in a right triangular manner when the angular orientation of said detector corresponds to the angular direction of said resultant air speed vector, pick-off means coupled with said detector for providing a first signal dependent upon the angular direction of said resultant component relative to the angular position of said detector, means supplying said signal to said detector positioning means for positioning said detector in an amount to reduce said detector signal toward zero whereby to align the orientation of said detector to the angular direction of said resultant air speed vector, and means responsive to a function of the operation of said positioning means for providing a measure of the forward air speed component of said craft whereby to provide a measure of the true air speed of said craft.

16. A device of the character recited in claim 15 in which said air flow direction detector includes a wind vane pivotally mounted for rotation about an axis perpendicular to the axis of rotation of said detector, said detector pick-off means comprising a strain gauge having an output proportional to the extent of rotation of said wind vane, and said detector positioning means comprises a motor connected between said strain gauge and said vane for rotating said guage and vane in a direction and in an amount such as to reduce said strain gauge signal toward zero.

17. A device of the character recited in claim 15 in which said air flow direction detector comprises a member journalled in said air craft for rotation about an axis parallel to the direction of travel of said craft, a pair of arms each pivotally mounted at one end thereof on said member and extending in opposite directions perpendicular to the axis of rotation thereof, an orifice positioned at the other end of each of said arms and near the leading edges thereof, said orifices being so relatively angularly disposed as to be subjected to equal air pressures when the position of said detector corresponds to the direction of said resultant speed component but are subjected to differential air pressure when the position of said detector corresponds to a direction other than the direction of said resultant air speed component, said detector pick-off means comprises a pressure-responsive device having an output corresponding to the differential air pressure at said orifices, and said detector-positioning means comprises a motor coupled with said arms for rotating the same in a direction and in an amount such as to reduce the differential pressure at said orifices toward zero.

18. An air speed measuring device in which the magnitude of the forward air speed vector of a moving object is determined from a measurable quantity corresponding to an air speed vector normal to the forward air speed vector and a measurable quantity corresponding to the direction of the vector resultant of said normal air speed vector and said forward air speed vector, said vectors being the sides of a right triangle mutually related in a trigonometric manner, said device comprising means including air-pressure-responsive means mounted on said craft for movement transversely of an axis parallel to the longitudinal axis of said object for providing an indication of the angular direction of said resultant air speed vector relative to said axis, said angular direction representing one determining element of said right triangle when said indicated angular direction is in alignment with the direction of said resultant vector, means for moving said pressure-responsive means transversely of said axis, the rate of movement thereof representing another determining element of said right triangle, and means responsive to said pressure-responsive means for varying the operation of one of the means which represents one of said determining elements so as to align said indicated angular direction with the direction of said resultant vector, the measure of the magnitude of said forward air speed vector being a function of measures of said normal air speed vector and said indicated angular direction.

19. A device for measuring the forward air speed of a craft comprising a detector for sensing the direction of ambient air flow mounted on said craft for movement in a direction normal to the direction of travel of the craft, means for so moving said detector whereby it will be subjected to the air speed component which is the resultant of respectively perpendicular components of the air speed of the craft and an air speed normal thereto, said air speed components defining vectors normally mutually related in a right triangular manner when the orientation of said detector is aligned with the direction of said resultant air speed component, means coupled with said detector for providing a measure of the angular orientation of said detector relative to said normal movement thereof, means coupled with said detector moving means for providing a measure of the magnitude of said normal air speed vector, means responsive to one of said measures for controlling the operation of one of the means providing said measures to align the orientation of said detector with the direction of said resultant vector, and means responsive to the operation of said control means for providing a measure of the magnitude of said forward air speed vector as a function of the angular orientation of said resultant vector and the magnitude of said normal air speed vector whereby to provide a measure of the forward air speed of the craft.

20. A device for determining the magnitude of the forward air speed vector of an aircraft from a determinable quantity corresponding to an air speed vector normal to the forward air speed vector and a determinable quantity corresponding to the direction of the vector resultant of said normal air speed vector and said forward air speed vector, said normal vector and said resultant vector defining the sides of a right triangle and said forward air speed vector being coincident with an axis parallel to the longitudinal axis of the craft and defining the base of said triangle, said device comprising a member mounted on said aircraft for movement in a direction substantially normal to the craft's longitudinal axis whereby said member is responsive to an air speed vector normal to said forward air speed vector, first means coupled with said member for sensing and providing an output quantity which represents a measure of the angle between said base and the one side of said right triangle corresponding to said resultant vector, second means coupled with said member and responsive to the movement thereof for providing an output quantity which represents a measure of the magnitude of said normal vector defining the other side of said right triangle, means for variably controlling one of said first and second means such that the measures represented by the outputs thereof and said resultant vector form a right triangle with respect to said base, and means responsive to the output of the means so varied for computing the magnitude of the base of said right triangle as a function of said angle and the magnitude of said normal side thereby to provide an output which is a measure of the magnitude of said forward air speed vector.

21. Apparatus for measuring the displacement of a body along a direction with respect to a fluid mass surrounding the body, comprising an element carried by the body to lie in the relative fluid stream, means mounting said element for rotation about an axis parallel with the direction, means imparting an auxiliary displacement at right angles to said direction to said element about said axis, means responsive to the auxiliary displacement of said element effective to derive a first quantity proportional to the auxiliary displacement, means responsive to the relative fluid flow at the element effective to derive a second quantity proportional to the cotangent of the angle made with the direction by the flow streamlines of the resultant relative fluid flow at the element, and means responsive to said quantities for computing the product of the said first and second quantities effective to derive a third quantity proportional to the displacement.

References Cited in the file of this patent

UNITED STATES PATENTS

| | | |
|---|---|---|
| 2,512,278 | Jones | June 20, 1950 |
| 2,524,747 | Ayres | Oct. 10, 1950 |
| 2,531,521 | Link | Nov. 28, 1950 |
| 2,632,327 | Smith | Mar. 24, 1953 |